United States Patent
Sakatani

(10) Patent No.: US 9,332,159 B2
(45) Date of Patent: May 3, 2016

(54) IMAGE READING APPARATUS AND IMAGE FORMING APPARATUS

(71) Applicant: Konica Minolta, Inc., Chiyoda-ku, Tokyo (JP)

(72) Inventor: Kazuomi Sakatani, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/703,957

(22) Filed: May 5, 2015

(65) Prior Publication Data

US 2015/0350493 A1    Dec. 3, 2015

(30) Foreign Application Priority Data

May 27, 2014    (JP) ................................. 2014-108791

(51) Int. Cl.
- *H04N 1/60*   (2006.01)
- *G06K 9/00*   (2006.01)
- *G03F 3/08*   (2006.01)

(52) U.S. Cl.
CPC ........... *H04N 1/6052* (2013.01); *H04N 1/6044* (2013.01); *H04N 1/6077* (2013.01); *H04N 1/6091* (2013.01)

(58) Field of Classification Search
None
See application file for complete search history.

(56) References Cited

U.S. PATENT DOCUMENTS

| | | | | |
|---|---|---|---|---|
| 3,778,541 A * | 12/1973 | Bowker | .................... | G01J 3/46 358/505 |
| 6,319,640 B1 * | 11/2001 | Slusarek | ............ | G03C 7/30511 430/21 |
| 8,964,246 B2 * | 2/2015 | Sakatani | ............ | G03G 15/0131 345/590 |
| 2003/0053092 A1 * | 3/2003 | Ohkubo | ............... | H04N 1/6033 358/1.9 |
| 2006/0170996 A1 * | 8/2006 | Headley | .............. | B41F 33/0045 358/518 |
| 2010/0149567 A1 * | 6/2010 | Kanazawa | ........... | H04N 1/6033 358/1.9 |
| 2012/0150471 A1 * | 6/2012 | Muto | ...................... | G01J 3/462 702/104 |
| 2012/0206746 A1 * | 8/2012 | Sakatani | .................. | H04N 1/60 358/1.9 |
| 2012/0294635 A1 * | 11/2012 | Yano | .................. | G03G 15/0189 399/39 |

(Continued)

FOREIGN PATENT DOCUMENTS

JP    2005-39364 A    2/2005
JP    2006-71693 A    3/2006

*Primary Examiner* — Madelein Nguyen
(74) *Attorney, Agent, or Firm* — Buchanan & Ingersoll & Rooney PC

(57) ABSTRACT

An image reading apparatus including: two image reading devices which are different from each other, read out a same surface of a same sheet after image formation on a sheet conveyance path and read out a plurality of common color patches formed in the same surface of the same sheet, one of the image reading devices being a first image reading device which reads out only a partial region in a main scanning direction and the other of the image reading devices being a second image reading device which reads out over an image formation width in the main scanning direction; and a calculation section which estimates a value equivalent to reading information of the first image reading device from reading information of the second image reading device on the basis of reading information obtained by reading out the common color patches.

10 Claims, 15 Drawing Sheets

(56) References Cited

U.S. PATENT DOCUMENTS

| | | | | |
|---|---|---|---|---|
| 2012/0327405 A1* | 12/2012 | Ebihara | ................ | G01J 3/0291 356/300 |
| 2013/0094039 A1* | 4/2013 | Takemura | .......... | G03G 15/2028 358/1.9 |
| 2013/0094041 A1* | 4/2013 | Takemura | ............ | H04N 1/6091 358/1.9 |
| 2013/0216244 A1* | 8/2013 | Miyazaki | ........... | G03G 15/5025 399/15 |
| 2013/0257970 A1* | 10/2013 | Wakayama | ............... | G01J 3/50 347/19 |
| 2013/0258368 A1* | 10/2013 | Shigemoto | ......... | H04N 1/00082 358/1.9 |
| 2013/0258369 A1* | 10/2013 | Suzuki | ................ | G06K 15/027 358/1.9 |
| 2015/0201110 A1* | 7/2015 | Sakatani | ............... | H04N 1/6044 358/504 |
| 2015/0350460 A1* | 12/2015 | Hirata | .................. | H04N 1/0057 358/498 |

* cited by examiner

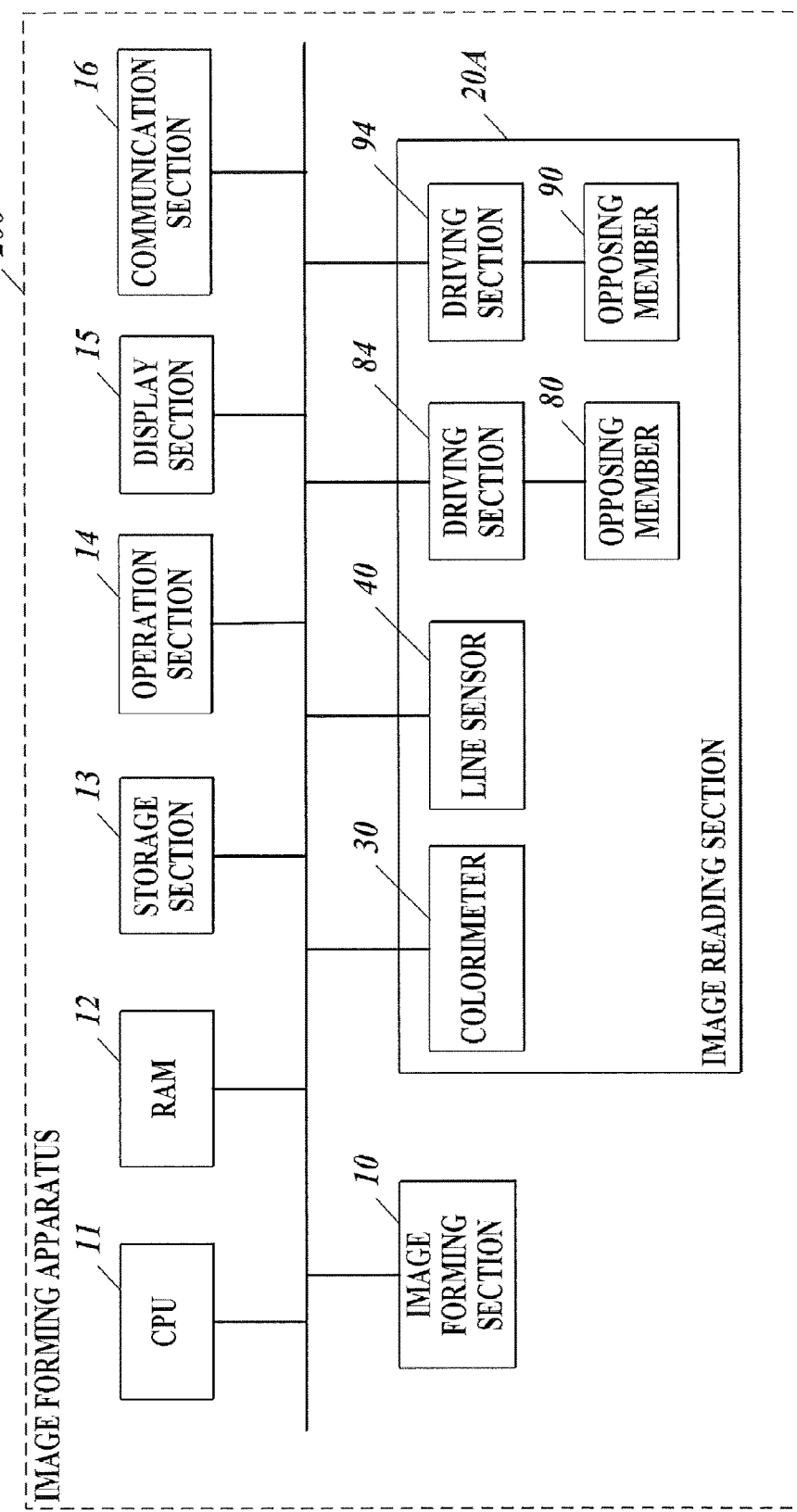

FIG.8

| MODE | LINE SENSOR | COLORIMETER | REMARKS |
|---|---|---|---|
| CALIBRATION | SHADING PLATE | CALIBRATION PLATE | PERFORM BEFORE COLOR ADJUSTMENT OPERATION |
| COLOR ADJUSTMENT | WHITE BACKING MEMBER | WHITE BACKING MEMBER | DEFAULT SETTING |
| | BLACK BACKING MEMBER | BLACK BACKING MEMBER | SELECTABLE |
| TWO-SIDES ADJUSTMENT | BLACK BACKING MEMBER | – | NOT USE COLORIMETER |

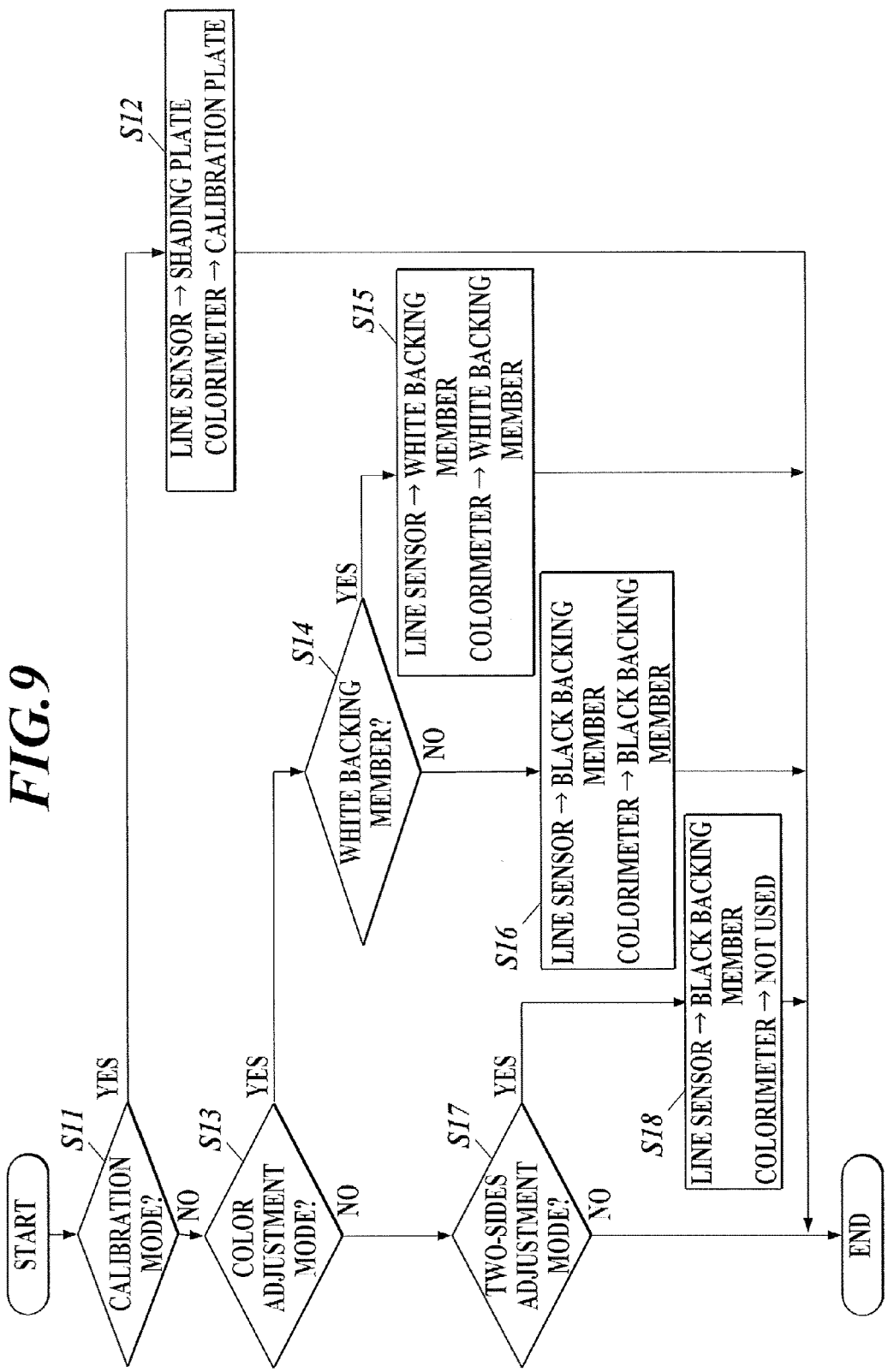

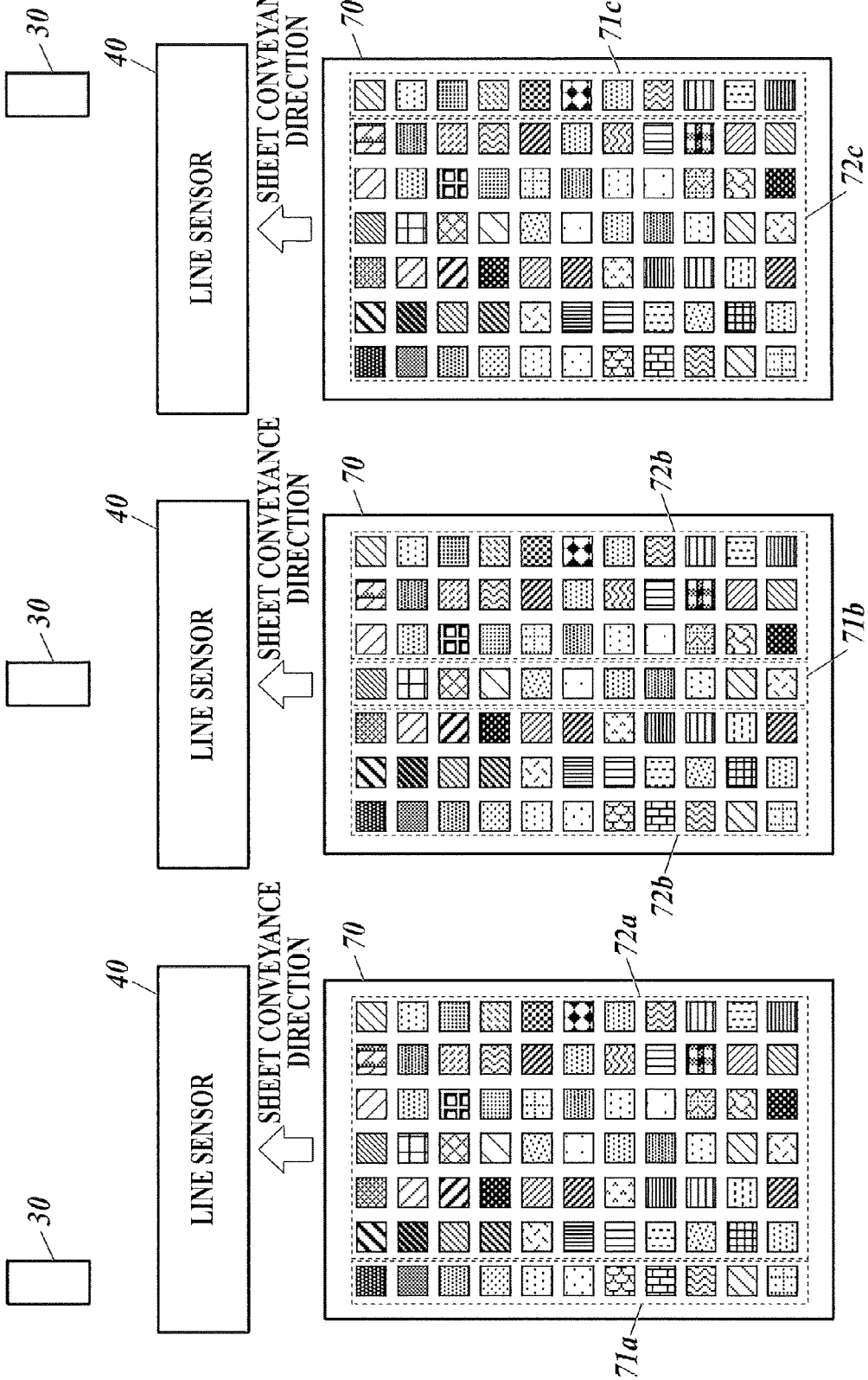
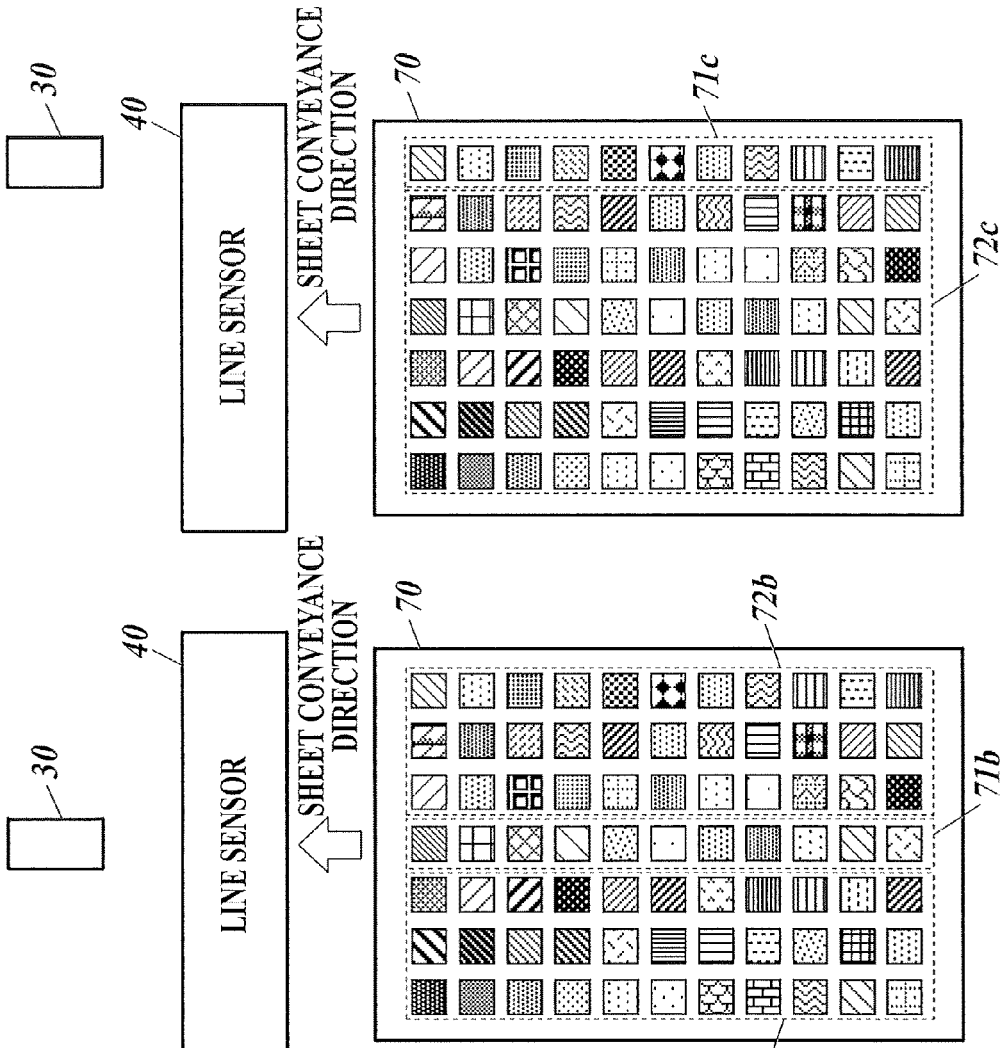
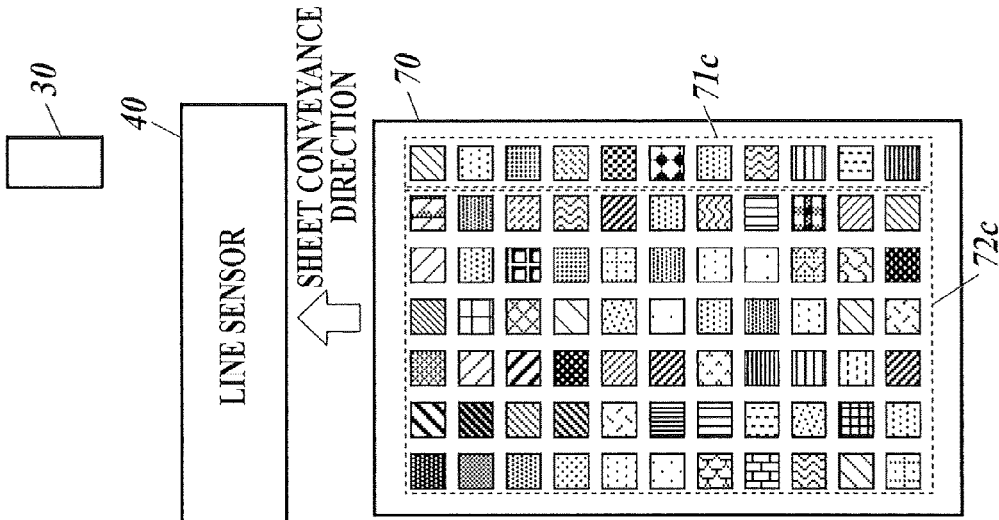

IMAGE READING APPARATUS AND IMAGE FORMING APPARATUS

BACKGROUND OF THE INVENTION

1. Field of the Invention

The present invention relates to an image reading apparatus and an image forming apparatus.

2. Description of Related Art

In electrophotographic image forming apparatuses, image densities, line widths and print positions change according to environmental or endurance changes of temperature, humidity and such like due to the characteristic of image formation using static electricity, and it has been difficult to output images stably.

Thus, in recent years, there have been apparatuses that can correct the changes including changes at secondary transferring sections and fixing sections by detecting color patches on sheets with line sensors set in sheet conveyance paths after fixation and feeding back the detection results to image forming conditions (see Japanese Patent Application Laid-Open Publication Nos. 2006-71693 and 2005-39364). This control ensures stable quality in each individual image forming apparatus.

However, in addition to quality assurance in individual image forming apparatuses, there has been a growing need for assurance of color absolute values especially in color image forming apparatuses.

Thus, there have been developed apparatuses which calibrate line sensors on the basis of results obtained by measuring color patches on sheets with spectrophotometers. That is, it is possible to estimate values equivalent to reading information (color values such as XYZ values and L*a*b* values) of spectrophotometers from reading information (RGB values and such like) of line sensors.

In image reading devices such as line sensors and spectrophotometers, backing members influence measurement values. The backing members are members set as background of sheets when images are read out. For example, a sample is placed on several layered sheets (white paper) which are the same paper as the sample to be measured and an image is read out by the image reading device.

The backing members are classified roughly into white backing members and black backing members. For example, when a white holder and a black holder are prepared as a copyholder of a flat head scanner, the user can select and purchase one of them. When a thin sheet is scanned by using a black backing member, the density is detected as higher at a background portion and a low density portion of the scanned image in some cases. The white backing members have various characteristics and are specified in detail in ISO 13655:2009, for example, to be opaque, to have a diffusing surface, not to include a fluorescent material, and to have a certain range of color saturation and luminosity as white backing conditions.

Accordingly, there has been possibility that accuracy of estimation calculation is lowered when two image reading devices use different backing members in a case where reading information of one image reading device is estimated from reading information of the other image reading device as in the above conventional techniques.

SUMMARY OF THE INVENTION

The present invention has been made in consideration of the above problems in the conventional techniques, and an object of the present invention is to improve estimation calculation accuracy when estimating reading information of an image reading device from reading information of another image reading device.

In order to achieve one of the above objects, according to one aspect of the present invention, there is provided an image reading apparatus including: two image reading devices which are different from each other, read out a same surface of a same sheet after image formation on a sheet conveyance path and read out a plurality of common color patches formed in the same surface of the same sheet, one of the image reading devices being a first image reading device which reads out only a partial region in a main scanning direction and the other of the image reading devices being a second image reading device which reads out over an image formation width in the main scanning direction; and a calculation section which estimates a value equivalent to reading information of the first image reading device from reading information of the second image reading device on the basis of reading information obtained by reading out the common color patches, wherein each of a backing member used for reading by the first image reading device and a backing member used for reading by the second image reading device is formed of a member having a same physical property.

Preferably, in the image reading apparatus, the physical property includes opaqueness, surface condition, whether a fluorescent material is included, saturation and luminosity.

Preferably, the image reading apparatus further includes a sheet conveyance path for the first image reading device to read the same surface of the same sheet a plurality of times; a movement section which moves the first image reading device along the main scanning direction; and a movement control section which controls the movement section so that the first image reading device reads out a different region in the main scanning direction each time the same sheet passes.

Preferably, in the image reading apparatus, the first image reading device is a colorimeter, and the second image reading device is a line sensor.

According to another aspect of the present invention, there is provided an image reading apparatus including: two image reading devices which are different from each other, read out a same surface of a same sheet after image formation on a sheet conveyance path and read out a plurality of common color patches formed in the same surface of the same sheet, one of the image reading devices being a first image reading device which reads out only a partial region in a main scanning direction and the other of the image reading devices being a second image reading device which reads out over an image formation width in the main scanning direction; a calculation section which estimates a value equivalent to reading information of the first image reading device from reading information of the second image reading device on the basis of reading information obtained by reading out the common color patches; white backing members which are respectively provided to the first image reading device and the second image reading device and each of which is formed of a member having a same physical property; black backing members which are respectively provided to the first image reading device and the second image reading device and each of which is formed of a member having a same physical property; switching sections which are respectively provided to the first image reading device and the second image reading device and each of which switches between a white backing member and a black backing member; and a switching control section which controls the switching sections to set a white backing member as a backing member used for reading by the first image reading device when a white backing member is used for reading by the second image reading device, and set a black backing member as a backing member used for reading by the first image reading device when a black backing member is used for reading by the second image reading device.

Preferably, in the image reading apparatus, the physical property includes opaqueness, surface condition, whether a fluorescent material is included, saturation and luminosity.

Preferably, the image reading apparatus further includes: a sheet conveyance path for the first image reading device to read the same surface of the same sheet a plurality of times; a movement section which moves the first image reading device along the main scanning direction; and a movement control section which controls the movement section so that the first image reading device reads out a different region in the main scanning direction each time the same sheet passes.

Preferably, in the image reading apparatus, the first image reading device is a colorimeter, and the second image reading device is a line sensor.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 6 is a block diagram showing a functional configuration of an image forming apparatus in a second embodiment;

FIG. 8 is a view showing surfaces of opposing members to be used for each mode;

FIG. 9 is a flow chart showing facing surface determination processing;

FIG. 14A is a view showing a relationship between a position in main scanning direction of colorimeter and a test chart;

FIG. 14B is a view showing a relationship between a position in main scanning direction of colorimeter and a test chart;

FIG. 14C is a view showing a relationship between a position in main scanning direction of colorimeter and a test chart.

DETAILED DESCRIPTION OF THE PREFERRED EMBODIMENT

First Embodiment

First, a first embodiment of an image forming apparatus according to the present invention will be described.

Figure 1:
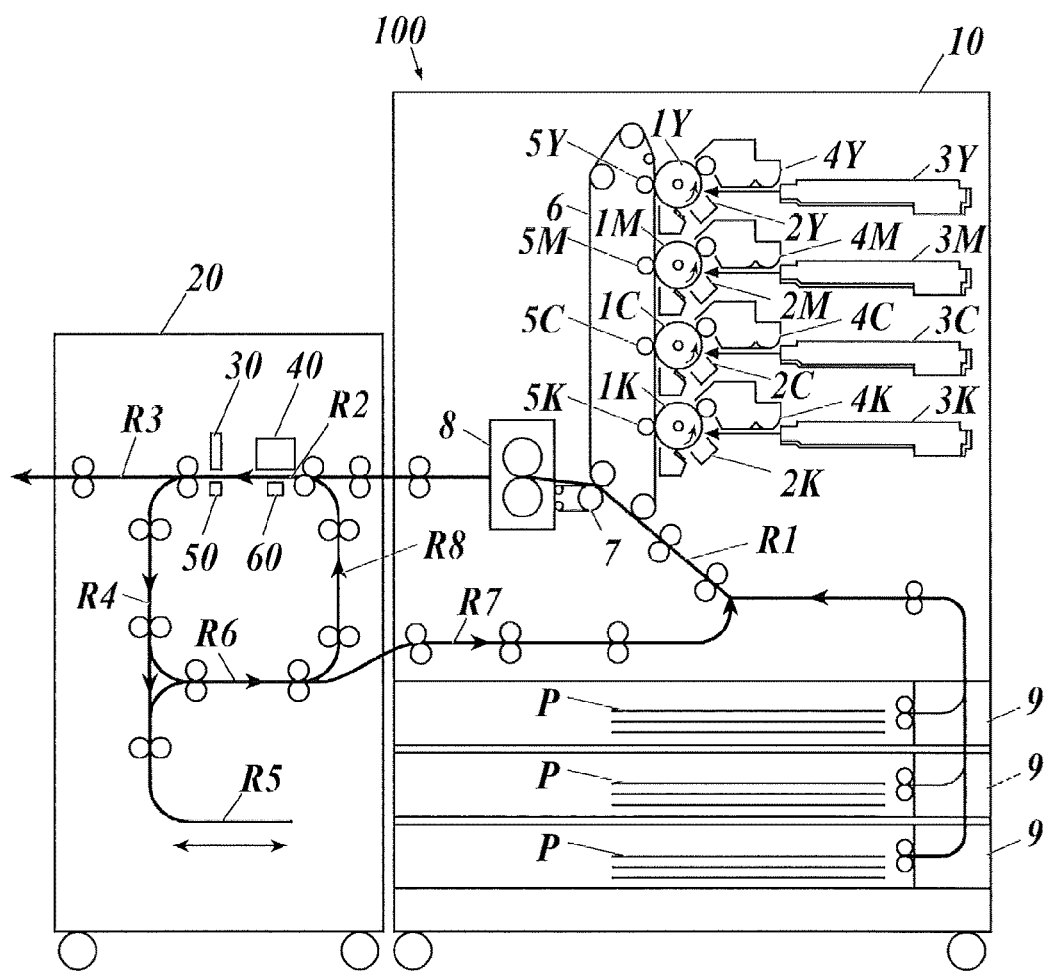
FIG. 1 is a schematic sectional view of an image forming apparatus in a first embodiment.

FIG. 1 is a schematic sectional view of an image forming apparatus 100 in the first embodiment.

The image forming apparatus 100 includes an image forming section 10, an image reading section 20 as an image reading apparatus and such like.

The image forming section 10 is for electrophotographic image formation and forms an image on a sheet P on the basis of image data corresponding to respective colors of yellow (Y), magenta (M), cyan (C) and black (K). The image forming section 10 includes photoreceptor drums 1Y, 1M, 1C and 1K, charging sections 2Y, 2M, 2C and 2K, exposing sections 3Y, 3M, 3C and 3K, developing sections 4Y, 4M, 4C and 4K, primary transferring rollers 5Y, 5M, 5C and 5K, an intermediate transfer belt 6, a secondary transfer roller 7, a fixing section 8, paper feeding sections 9 and such like.

A yellow toner image is formed on the photoreceptor drum 1Y. The charging section 2Y uniformly charges the photoreceptor drum 1Y. The exposing section 3Y scans and exposes the surface of photoreceptor drum 1Y with laser beams to form an electrostatic latent image on the basis of the yellow image data. The developing section 4Y attaches yellow toner to the electrostatic latent image on the photoreceptor drum 1Y to perform development.

The same processing is performed with respect to the other colors of magenta, cyan and black.

The toner images of respective colors formed on the photoreceptor drums 1Y, 1M, 1C and 1K are sequentially transferred (primary transfer) onto the intermediate transfer belt 6 by the primary transfer rollers 5Y, 5M, 5C and 5K. That is, color toner images formed of overlapping four color toner images are formed on the intermediate transfer belt 6.

The color toner images on the intermediate transfer belt 6 are transferred all at once onto one surface of the sheet P, which was fed from a paper feeding section 9, by the secondary transfer roller 7 (secondary transfer).

The fixing section 8, which includes a heating roller heating the sheet P on which the color toner images are transferred and a pressing roller pressing the sheet P, fixes the color toner images onto the sheet P by heating and pressing.

The image reading section 20 includes a colorimeter 30 as a first image reading device, a line sensor 40 as a second image reading device, a backing member 50 of the colorimeter 30, a backing member 60 of the line sensor 40 and such like.

The colorimeter 30 and the line sensor 40 are provided so as to be close to each other in the downstream side of the fixing section 8 in the conveyance direction of the sheet P. The colorimeter 30 and the line sensor 40 can read out the same surface of the same sheet after the image formation on the sheet conveyance path (on the sheet conveyance path in the apparatus). The colorimeter 30 and the line sensor 40 read color patches formed on the sheet P.

The colorimeter 30 is a spectrophotometer which detects spectral reflectivity of the image formed on the sheet P for each wavelength and measures the colors of the image (color values such as XYZ values and L*a*b* values). The colorimeter 30 can read out only a portion in the main scanning direction (direction orthogonal to the conveyance direction of sheet P and parallel to the sheet surface).

The line sensor 40 has CCDs (Charge Coupled Devices) which are arranged in lines over the entire image formation width in the main scanning direction, and reads out a one-dimensional image. By reading out the image in accordance with the timing of conveying the sheet P after image formation, the line sensor 40 acquires a two-dimensional image formed on the sheet P. That is, the line sensor 40 can read out the image over the image formation width in the main scanning direction. The line sensor 40 outputs image data (RGB value) having a tone value of each color to the CPU 11 (see FIG. 2) for each channel of red (R), green (G) and blue (B).

The backing member 50 is a background of the sheet P when the image formed on the sheet P is read out by the colorimeter 30.

The backing member 60 is a background of the sheet P when the image formed on the sheet P is read out by the line sensor 40.

The backing members 50 and 60 are set at positions facing the positions read out by the colorimeter 30 and the line sensor 40, respectively.

Each of the backing members 50 and 60 is formed of a member having the same physical property. The physical property includes opaqueness, surface condition, whether a fluorescent material is included, saturation, luminosity and such like.

The degree of opaqueness is used as the opaqueness, for example.

Whether the surface is a diffuse reflector is used as the surface condition, for example.

YUPO paper (registered trademark) and such like are used as a backing member in white color (hereinafter, referred to as a white backing member). The white backing conditions are described in ISO 13655:2009 AnnexA. 3, for example.

The conditions as a backing member in black color (hereinafter, referred to as a black backing member) are that the spectral density change is 5% or less in the visible range, specular reflection does not occur, visual density is 1.50±0.02, and such like, for example.

The image forming apparatus 100 can form an image on the both surfaces of the sheet P.

In a case where an image is formed on only one surface of the sheet P, the sheet P is conveyed through the conveyance path R1, the image is formed on the sheet P by the image forming section 10, and thereafter the sheet P is conveyed through the conveyance paths R2 and R3 to be ejected.

On the other hand, in a case where an image is formed on the both surfaces of the sheet P, the sheet P is conveyed through the conveyance path R1 and an image is formed on a surface of the sheet P by the image forming section 10. Thereafter, the sheet P is conveyed through the conveyance paths R2 and R4, inverted by the conveyance path R5 and thereafter conveyed through the conveyance paths R6 and R7 to shift to the image formation of the back surface. That is, the sheet P is conveyed through the conveyance path R1, an image is formed on the back surface of the sheet P by the image forming section 10, and thereafter the sheet P is conveyed through the conveyance paths R2 and R3 to be ejected.

Figure 2:
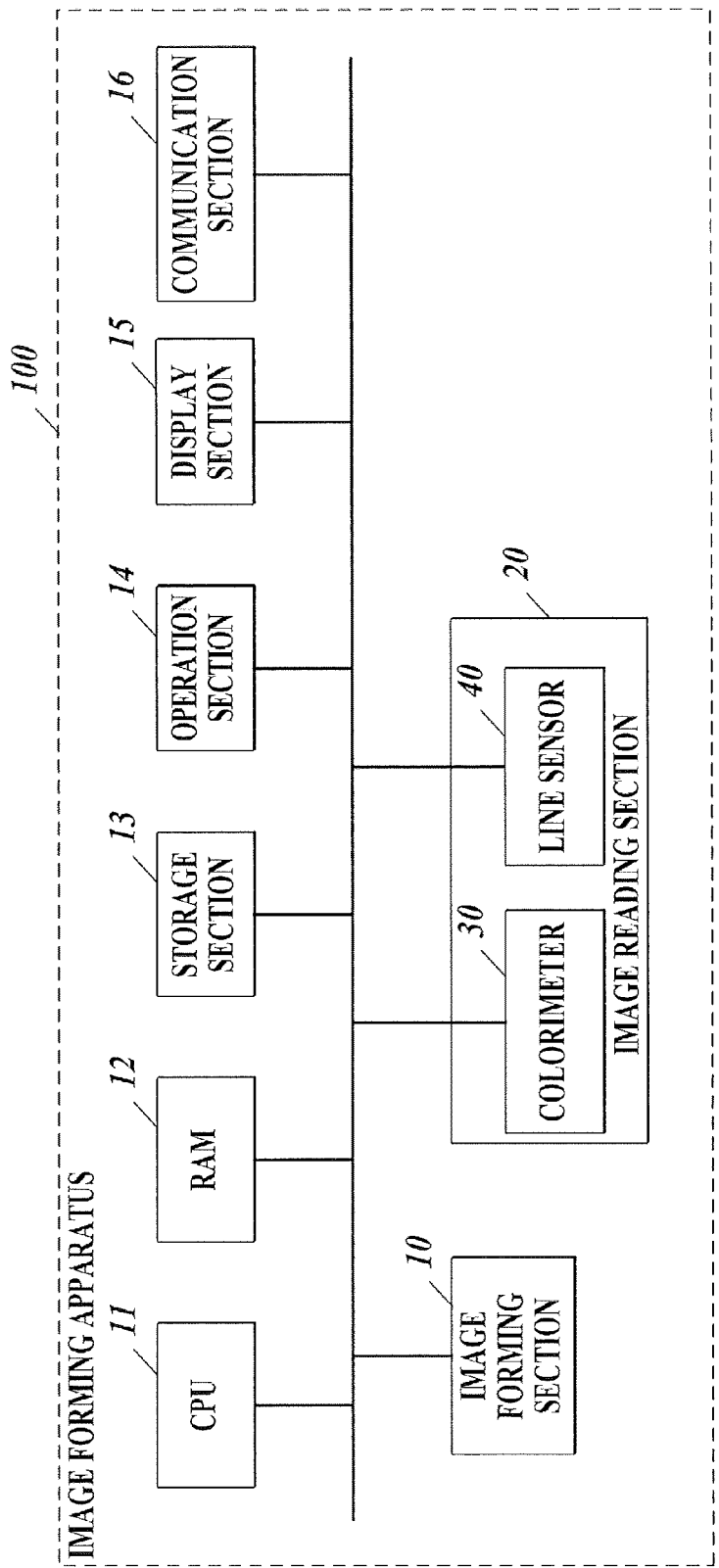
FIG. 2 is a block diagram showing a functional configuration of the image forming apparatus in the first embodiment.

FIG. 2 is a block diagram showing a functional configuration of the image forming apparatus 100.

As shown in FIG. 2, the image forming apparatus 100 includes a CPU (Central Processing Unit) 11, a RAM (Random Access Memory) 12, a storage section 13, an operation section 14, a display section 15, a communication section 16, an image forming section 10, an image reading section 20 and such like. Explanation will be omitted for the configurations which have been already described.

The CPU 11 integrally controls operations of the sections of the image forming apparatus 100 in accordance with various processing programs stored in the storage section 13 on the basis of operation signals input from the operation section 14 or instruction signals received by the communication section 16.

The RAM 12 forms a work area which temporarily stores various processing programs, input or output data, parameters and such like which are read out from the storage section 13 in various types of processing which are executed and controlled by the CPU 11.

The storage section 13 is formed of hard disk, flash memory and such like, and stores various processing programs, and various types of data such as parameters and files necessary to execute the programs.

The operation section 14 includes a touch panel formed so as to cover the display screen of the display section 15 and various operation buttons such as number buttons and a start button, and outputs an operation signal based on user's operation to the CPU 11.

The display section 15 is formed of an LCT (Liquid Crystal Display) and displays various screens in accordance with instructions of display signals input from the CPU 11.

The communication section 16 transmits and receives data to and from an external apparatus connected to a communication network such as a LAN (Local Area Network).

The CPU 11 controls the image forming section 10 to form an adjustment pattern including a plurality of color patches on the sheet P. The adjustment pattern is formed on one or a plurality of sheets P according to the number of the color patches to be used.

The CPU 11 acquires reading information obtained by reading the common plurality of color patches formed on the same surface of the same sheet from each of the colorimeter 30 and the line sensor 40.

The CPU 11 estimates values equivalent to reading information (color values) of the colorimeter 30 from reading information (RGB values) of the line sensor 40 on the basis of the reading information obtained by reading out the common color patches. That is, the CPU 11 functions as a calculation section.

Figure 3:
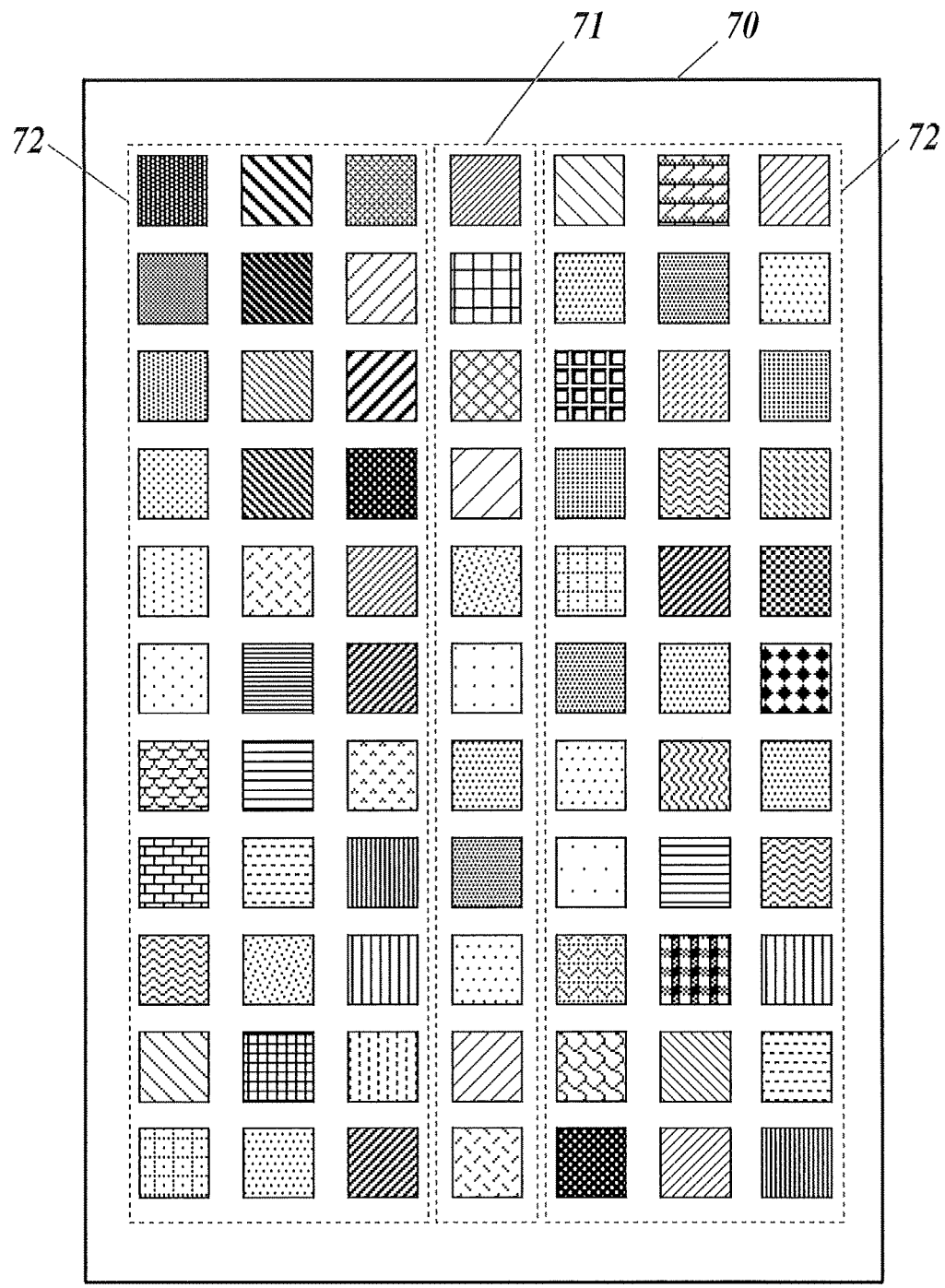
FIG. 3 is an example of a test chart.

FIG. 3 is an example of a test chart 70 forming an adjustment pattern including a plurality of color patches. The test chart 70 includes a color patch group 71 which is read by both the colorimeter 30 and the line sensor 40, and color patch groups 72 which are read out only by the line sensor 40. Generally, 1000 or more color patches are necessary to update a color profile.

Figure 4:
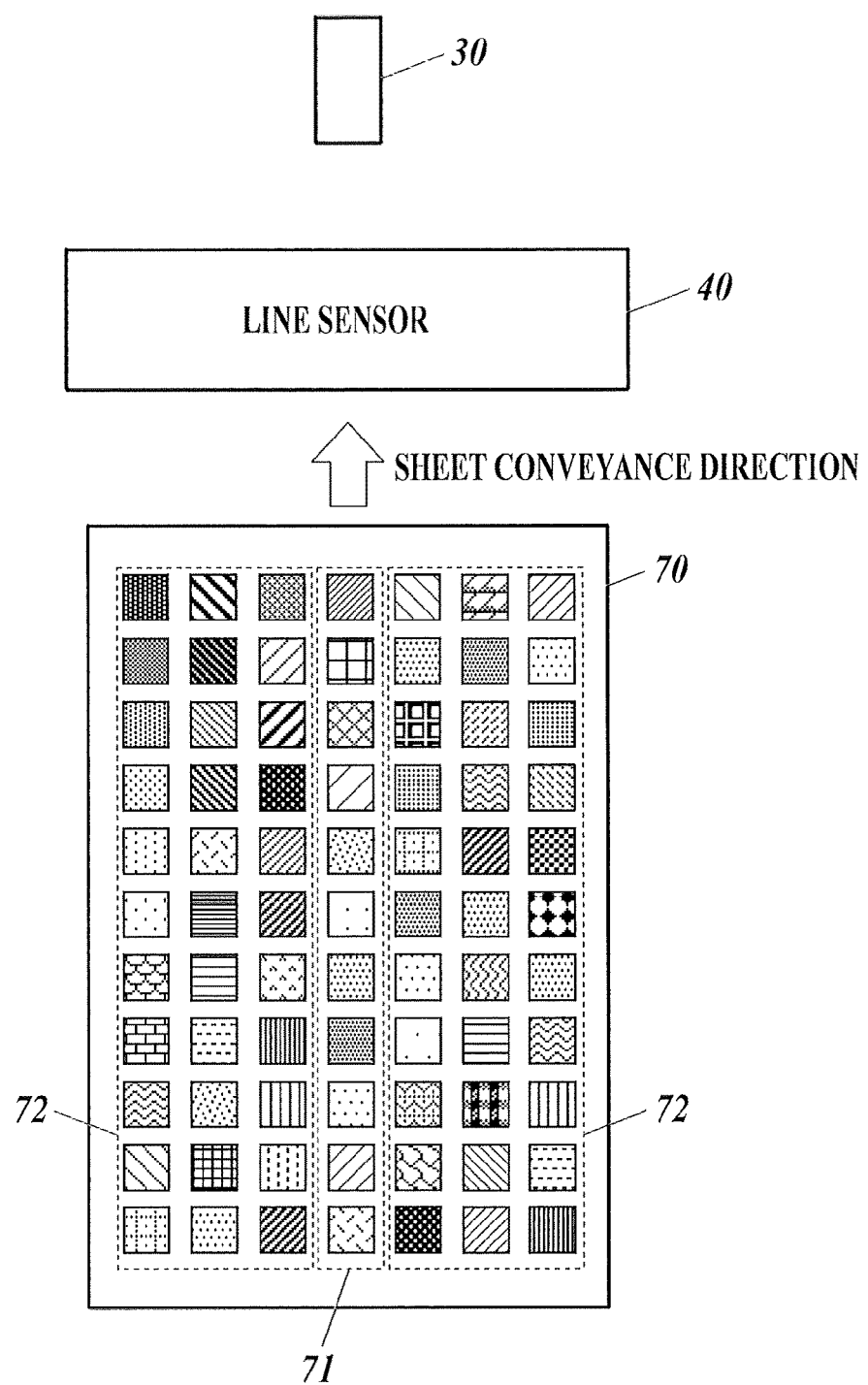
FIG. 4 is a view showing a relationship between a colorimeter, a line sensor and a test chart.

FIG. 4 schematically shows a relationship between the colorimeter 30, the line sensor 40 and the test chart 70. Since the colorimeter 30 can read out only a part of the region in the main scanning direction, if all the color patches necessary to update the color profile are to be measured only by the colorimeter 30, a large amount of waste paper is necessary, which is not practical. Thus, main color patches (color patches optimized for creating a scanner profile of the line sensor 40) are arranged on a region to be read out by the colorimeter 30, and color patches necessary to create a color profile (printer profile) of the image forming apparatus 100 is arranged on the other region.

Apart of the plurality of color patches (color patch group 71) included in the test chart 70 is measured by both of the line sensor 40 and the colorimeter 30, and the other color patches (color patch groups 72) are measured only by the line sensor 40.

Next, an operation of the image forming apparatus 100 in a first embodiment will be described.

Figure 5:
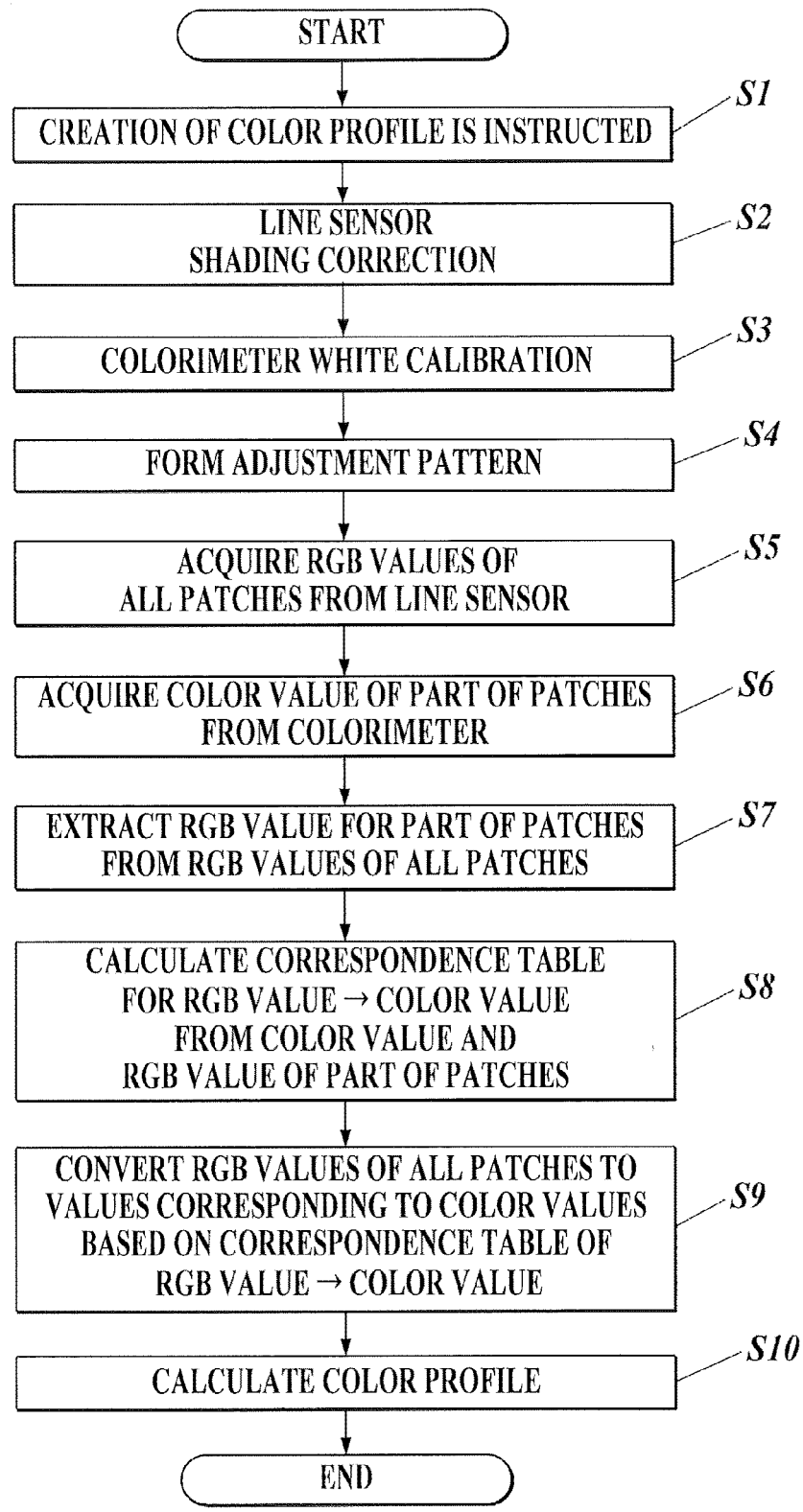
FIG. 5 is a flow chart showing first image adjustment processing.

FIG. 5 is a flow chart showing first image adjustment processing. The processing is achieved by software processing in cooperation between the CPU 11 and a program stored in the storage section 13.

First, when creation of color profile is instructed by an operation of the operation section 14 (step S1), the CPU 11 acquires reading information obtained by the line sensor 40 reading out a shading plate (not shown in the drawings), and performs shading correction (step S2). The shading correction is processing for correcting density irregularity due to the difference in characteristics of CCDs included in the line sensor 40. At this time, the shading plate is placed at a position facing the line sensor 40. The line sensor 40 reads out the shading plate in a state in which there is no sheet P between the line sensor 40 and the shading plate.

Next, the CPU 11 acquires reading information obtained by the colorimeter 30 reading out a calibration plate (not shown in the drawing), and performs white calibration of the colorimeter 30 (step S3). The white calibration is processing for adjusting output values of the colorimeter 30 to absolute values. At this time, the calibration plate is placed at a position facing the colorimeter 30. The colorimeter 30 reads out the calibration plate in a state in which there is no sheet P between the colorimeter 30 and the calibration plate.

Next, the CPU 11 reads out image data (CMYK values) of the adjustment pattern from the storage section 13, controls the image forming section 10 to form the adjustment pattern on the sheet P and outputs the test chart 70 (step S4).

Next, the CPU 11 acquires RGB values obtained by reading out all the color patches included in the test chart 70 from the line sensor 40 (step S5). At this time, the backing member 60 is used. The CPU 11 associates the obtained RGB values with respective color patches (CMYK values) and stores the values in the RAM 12.

Next, the CPU 11 acquires, from the colorimeter 30, color values (XYZ values, L*a*b* values and such like) obtained by reading out a part of color patches (color patch group 71 in FIG. 3) included in the region corresponding to the position of the colorimeter 30 in the main scanning direction among the color patches included in the test chart 70 (step S6). At this time, the backing member 50 is used. The CPU 11 associates the obtained color values with respective color patches (CMYK values) and stores the values in the RAM 12.

The CPU 11 extracts RGB values corresponding to the part of color patches (color patches read out by the colorimeter 30) from the RGB values corresponding to all the color patches obtained in step S5 (step S7).

The CPU 11 calculates a correspondence table for converting the RGB values of the line sensor 40 into color values of colorimeter 30 on the basis of the reading information of the part of color patches commonly read out by the colorimeter 30 and the line sensor 40 (step S8). That is, the CPU 11 estimates values equivalent to the color values of colorimeter 30 from the RGB values of line sensor 40. The CPU 11 stores the correspondence table in the storage section 13. Instead of the correspondence table, a relational expression for converting the RGB values to color values may be obtained.

The CPU 11 converts the RGB values of all the color patches read out by the line sensor 40 into values equivalent to color values on the basis of the correspondence table for converting the RGB values to the color values (step S9). Thus, the correspondence relation between the RGB values and the color values for all the color patches (scanner profile of line sensor 40) is obtained.

The CPU 11 calculates the color profile of image forming apparatus 100 on the basis of the CMYK values corresponding to the respective color patches and the estimated color values corresponding to the respective color patches obtained in step S9 (step S10). The CPU 11 stores the calculated color profile in the storage section 13 and updates.

Then, the first image adjustment processing ends.

As described above, according to the first embodiment, by setting the backing members 50 and 60 which are respectively used for the reading by the colorimeter 30 and the line sensor 40 to have a same physical property, it is possible to improve estimation calculation accuracy when estimating reading information (color values) of the colorimeter 30 from the reading information (RGB values) of line sensor 40 relatively without being influenced by the sheet P (especially, thickness thereof) and density of color patches (especially light color).

For example, it is possible to match a condition when reading out an image by the colorimeter 30 to a condition of reading by the line sensor 40 by matching opaqueness, surface condition, whether to include a fluorescent material, saturation degree, luminosity degree and such like as the physical property of backing members 50 and 60.

It is also possible to achieve calibration of line sensor 40 with high accuracy according to the type and thickness of the sheet P.

Furthermore, even a person who has no special technique can perform color management of the image forming apparatus 100, achieving labor saving.

Second Embodiment

Next, the second embodiment to which the present invention is applied will be described.

Since an image forming apparatus 200 in the second embodiment has the same configuration as that of the image forming apparatus 100 shown in the first embodiment, FIG. 1 is used and explanation of the common configurations is omitted. The test chart 70 is also the same as that shown in FIG. 3. Hereinafter, the configuration and processing characteristic of the second embodiment will be described.

FIG. 6 is a block diagram showing a functional configuration of the image forming apparatus 200.

As shown in FIG. 6, the image forming apparatus 200 includes a CPU 11, a RAM 12, a storage section 13, an operation section 14, a display section 15, a communication section 16, an image forming section 10, an image reading section 20A and such like. The explanation of configurations which are same as those of the image forming apparatus 100 is omitted.

The image reading section 20A includes a colorimeter 30, a line sensor 40, an opposing member 80, an opposing member 90, a driving section 84, a driving section 94 and such like.

Figure 7A:
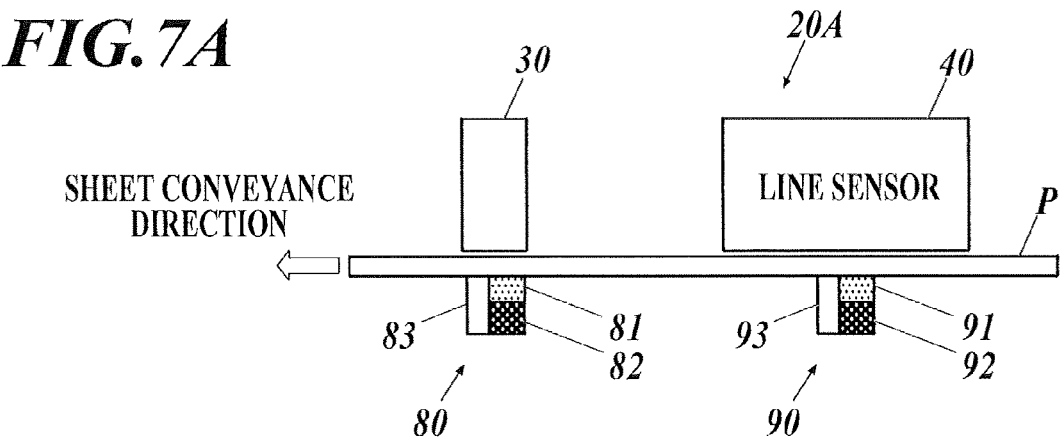
FIG. 7A is an example of reading by using white backing members in the second embodiment.
Figure 7B:
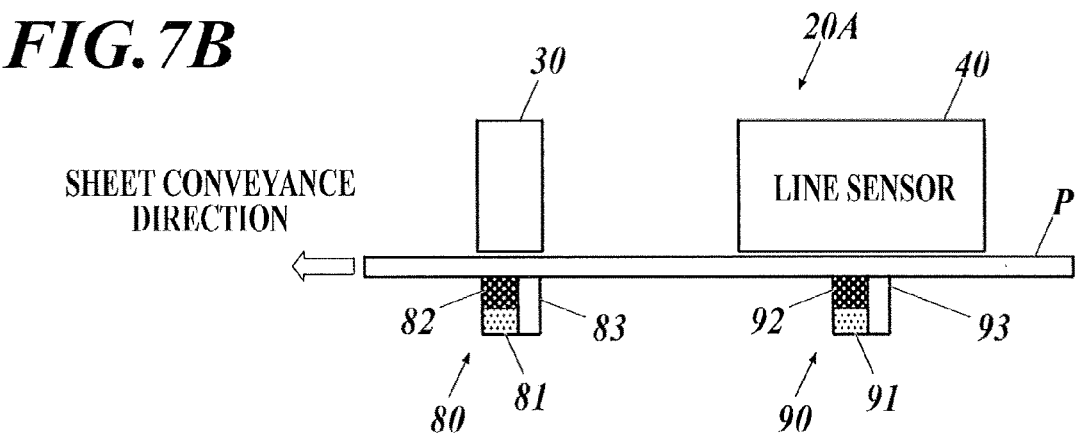
FIG. 7B is an example of reading by using black backing members in the second embodiment.
Figure 7C:
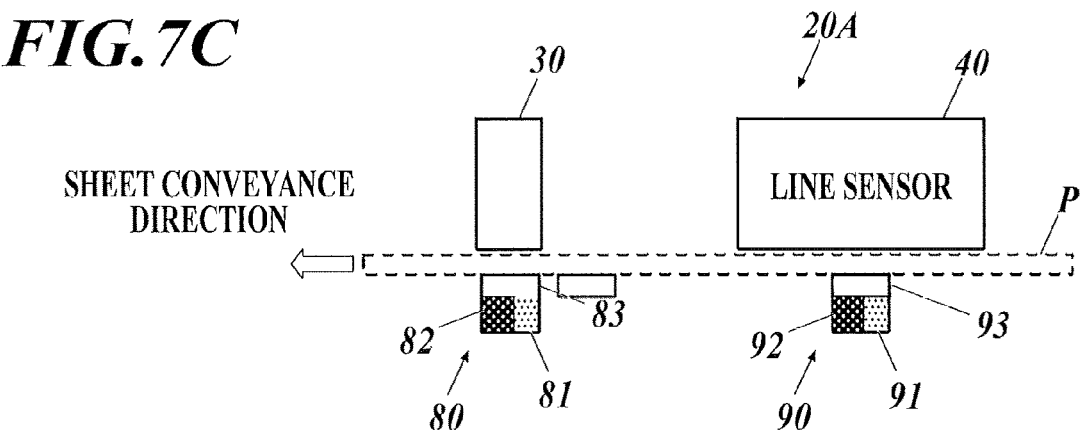
FIG. 7C is an example of calibration in the second embodiment.

FIGS. 7A, 7B and 7C are schematic views of the image reading section 20A.

The opposing member 80 is provided at the position facing the colorimeter 30.

The opposing member 80 is rotatable around a shaft along the main scanning direction. The cross section of the opposing member 80 orthogonal to the shaft along the main scanning direction is in a nearly square shape, and the opposing member 80 has surfaces of a white backing member 81, a black backing member 82 and a calibration plate 83. By the opposing member 80 being rotated, any one surface of the white backing member 81, the black backing member 82 and the calibration plate 83 is located at the position facing the colorimeter 30.

The opposing member 90 is provided at the position facing the line sensor 40.

The opposing member 90 is rotatable around a shaft along the main scanning direction. The cross section of the opposing member 90 orthogonal to the shaft along the main scanning direction is in a nearly square shape, and the opposing member 90 has surfaces of a white backing member 91, a black backing member 92 and a shading plate 93. By the opposing member 90 bring rotated, any one surface of the white backing member 91, the black backing member 92 and the shading plate 93 is located at the position facing the line sensor 40.

In FIG. 7A, the white backing member 81 of the opposing member 80 is located at the position facing the colorimeter 30, and the white backing member 91 of the opposing member 90 is located at the position facing the line sensor 40. In FIG. 7B, the black backing member 82 of the opposing member 80 is located at the position facing the colorimeter 30, and the black backing member 92 of the opposing member 90 is located at the position facing the line sensor 40. In FIG. 7C, the calibration plate 83 of the opposing member 80 is located at the position facing the colorimeter 30, and the shading plate 93 of the opposing member 90 is located at the position facing the line sensor 40.

Each of the white backing member 81 of the opposing member 80 and the white backing member 91 of the opposing member 90 is formed of a member having the same physical property.

Each of the black backing member 82 of the opposing member 80 and the black backing member 92 of the opposing member 90 is formed of a member having the same physical property.

The calibration plate 83 of the opposing member 80 and the shading plate 93 of the opposing member 90 may use reference white optimized for the respective devices (colorimeter 30 and the line sensor 40).

The driving section 84 rotates the opposing member 80 to switch the surface facing the colorimeter 30 to any one of the white backing member 81, the black backing member 82 and the calibration plate 83. That is, the driving section 84 functions as a switching section.

The driving section 94 rotates the opposing member 90 to switch the surface facing the line sensor 40 to any one of the white backing member 91, the black backing member 92 and the shading plate 93. That is, the driving section 94 functions as a switching section.

The driving section 84 and the driving section 94 are formed of a stepping motor, for example.

The CPU 11 controls the driving section 84 and the driving section 94 so that the white backing member 81 is used for the reading by the colorimeter 30 when the white backing member 91 is used for the reading by the line sensor 40 and so that the black backing member 82 is used for the reading by the colorimeter 30 when the black backing member 92 is used for the reading by the line sensor 40. That is, the CPU 11 functions as a switching control section.

FIG. 8 is a view indicating a surface of opposing member 80 facing the colorimeter 30 and a surfaces of opposing member 90 facing the line sensor 40 for each of calibration mode, color adjustment mode and two-side adjustment mode.

The calibration mode is a mode for performing white calibration and shading correction by reading out a predetermined reference white (calibration plate 83, shading plate 93) with the colorimeter 30 and the line sensor 40, respectively.

The color adjustment mode is a mode for creating a color profile by reading out the color patches with the colorimeter 30 and the line sensor 40.

The two-side adjustment mode is a mode for matching positions on a front surface to those on a back surface by reading out images formed on the front surface and the back surface of the sheet P with the line sensor 40. It is preferable to use the black backing member 92 in the two-side adjustment mode, for example, in order to match image positions on both surfaces according to distances of register marks (cross lines) formed on the sheet P from an end portion of the sheet P.

Next, an operation of the image forming apparatus 200 in the second embodiment will be described.

The first image adjustment processing is similar to that of FIG. 5.

FIG. 9 is a flow chart showing facing surface determination processing. The processing is achieved by software processing in cooperation between the CPU 11 and a program stored in the storage section 13.

First, the CPU 11 determines whether the apparatus is in the calibration mode (step S11). If the apparatus is in the calibration mode (step S11; YES), the CPU 11 controls the driving section 94 to rotate the opposing member 90 so that the line sensor 40 faces the shading plate 93, and controls the driving section 84 to rotate the opposing member 80 so that the colorimeter 30 faces the calibration plate 83 (see FIG. 7C) (step S12). That is, in steps S2 and S3 of FIG. 5, the shading plate 93 of the opposing member 90 and the calibration plate 83 of the opposing member 80 face the line sensor 40 and the colorimeter 30, respectively. Here, the line sensor 40 reads out the shading plate 93 in a state in which there is no sheet P between the line sensor 40 and the shading plate 93. The colorimeter 30 reads out the calibration plate 83 in a state in which there is no sheet P between the colorimeter 30 and the calibration plate 83.

If the apparatus is not in the calibration mode in step S11 (step S11; NO), the CPU 11 determines whether the apparatus is in the color adjustment mode (step S13). If the apparatus is in the color adjustment mode (step S13; YES), the CPU 11 determines whether the white backing member is specified as a backing member in the color adjustment mode (step S14). The user has specified in advance whether to use the white backing member or black backing member as the backing member in the color adjustment mode, and information indicating which backing member to use is stored in the storage section 13.

If the white backing member is specified as a backing member (step S14; YES), the CPU 11 controls the driving section 94 to rotate the opposing member 90 so that the line sensor 40 faces the white backing member 91, and controls the driving section 84 to rotate the opposing member 80 so that the colorimeter 30 faces the white backing member 81 (see FIG. 7A) (step S15). That is, in steps S5 and S6 of FIG. 5, if the white backing member is specified, the white backing member 91 of the opposing member 90 and the white backing member 81 of the opposing member 80 face the line sensor 40 and the colorimeter 30, respectively. Here, the line sensor 40 reads out the color patches included in the test chart 70 with the white backing member 91 as the background. The colorimeter 30 reads out the color patches included in the test chart 70 with the white backing member 81 as the background.

In step S14, if the black backing member is specified as a backing member (step S14; NO), the CPU 11 controls the driving section 94 to rotate the opposing member 90 so that the line sensor 40 faces the black backing member 92, and controls the driving section 84 to rotate the opposing member 80 so that the colorimeter 30 faces the black backing member 82 (see FIG. 7B) (step S16). That is, in steps S5 and S6 of FIG. 5, if the black backing member is specified, the black backing member 92 of the opposing member 90 and the black backing member 82 of the opposing member 80 face the line sensor 40 and the colorimeter 30, respectively. Here, the line sensor 40 reads out the color patches included in the test chart 70 with the black backing member 92 as the background. The colorimeter 30 reads out the color patches included in the test chart 70 with the black backing member 82 as the background.

If the apparatus is not in the color adjustment mode in step S13 (step S13; NO), the CPU 11 determines whether the apparatus is in the two-side adjustment mode (step S17). If the apparatus is in the two-side adjustment mode (step S17; YES), the CPU 11 controls the driving section 94 to rotate the opposing member 90 so that the line sensor 40 faces the black backing member 92 (step S18). In the two-side adjustment mode, the colorimeter 30 may face any surface of the opposing member 80 since the colorimeter 30 is not used.

After steps S12, S15, S16 and S18 or if the apparatus is not in the two-side adjustment mode in step S17 (step S17; NO), the facing surface determination processing ends.

As described above, according to the second embodiment, it is possible to improve the estimation calculation accuracy when estimating the reading information (color values) of colorimeter 30 from the reading information (RGB values) of the line sensor 40 by setting the backing members (white backing members 81 and 91, black backing members 82 and 92) used for reading by the colorimeter 30 and the line sensor 40 to have the same physical property.

Furthermore, it is possible to easily switch the surface of the opposing member 80 facing the colorimeter 30 by controlling the driving section 84 to rotate the opposing member 80.

It is also possible to easily switch the surface of the opposing member 90 facing the line sensor 40 by controlling the driving section 94 to rotate the opposing member 90.

In the second embodiment, the opposing members 80 and 90 include both white backing members 81 and 91 and black backing members 82 and 92. However, among at least two surfaces included in each of the opposing members 80 and 90, one surface may be the same backing member (white or black backing member) and the other surface may be a member for calibration (calibration plate or shading plate).

The second embodiment has been described by illustrating an example in which the cross sections orthogonal to the rotation shaft of the opposing members 80 and 90 are in nearly square shape; however, the shapes of the opposing members 80 and 90 are not limited as long as the surfaces facing the colorimeter 30 and line sensor 40 can be switched.

Modification Example

Next, a modification example of the second embodiment will be described.

The second embodiment has been described for a case where the surfaces facing the colorimeter 30 and the line sensor 40 are changed by rotating the opposing members 80 and 90. In the modification example, the regions facing the colorimeter 30 and the line sensor 40 are changed by sliding the opposing members.

Hereinafter, only a part of the configuration different from that of second embodiment will be described.

The image forming apparatus in the modification example includes an image reading section 20B.

Figure 10A:
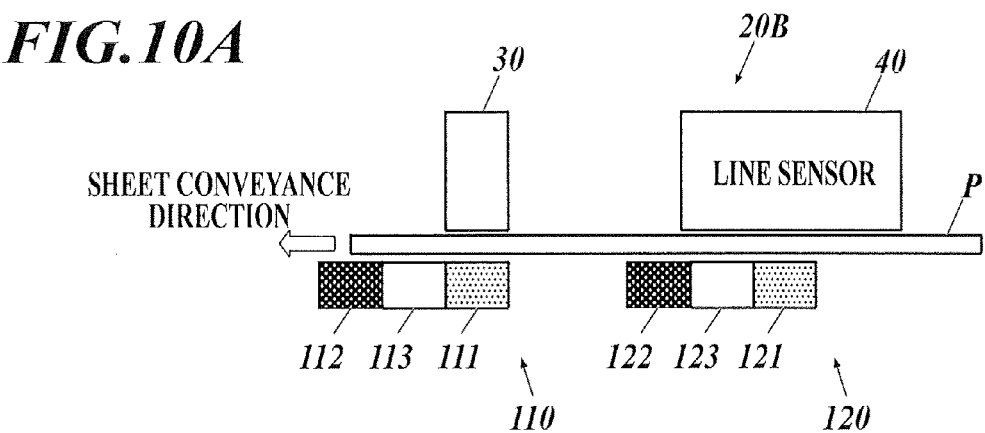
FIG. 10A is an example of reading by using white backing members in a modification example of the second embodiment.
Figure 10B:
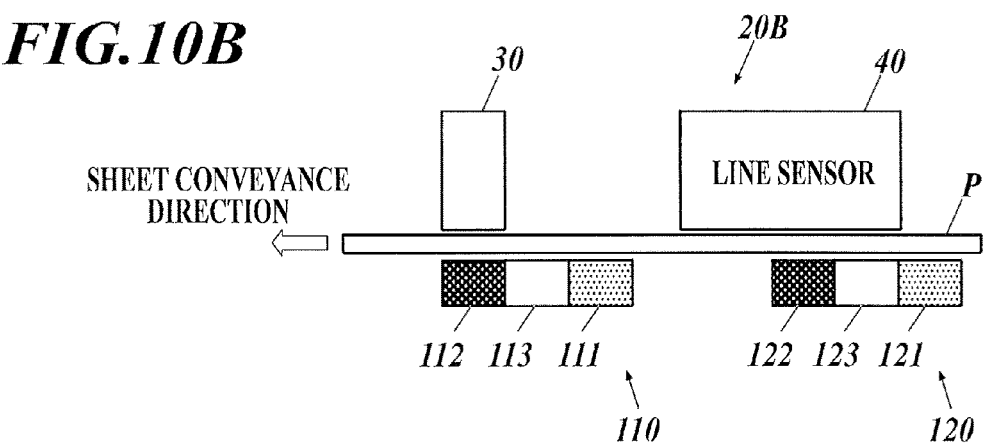
FIG. 10B is an example of reading by using black backing members in a modification example of the second embodiment.
Figure 10C:
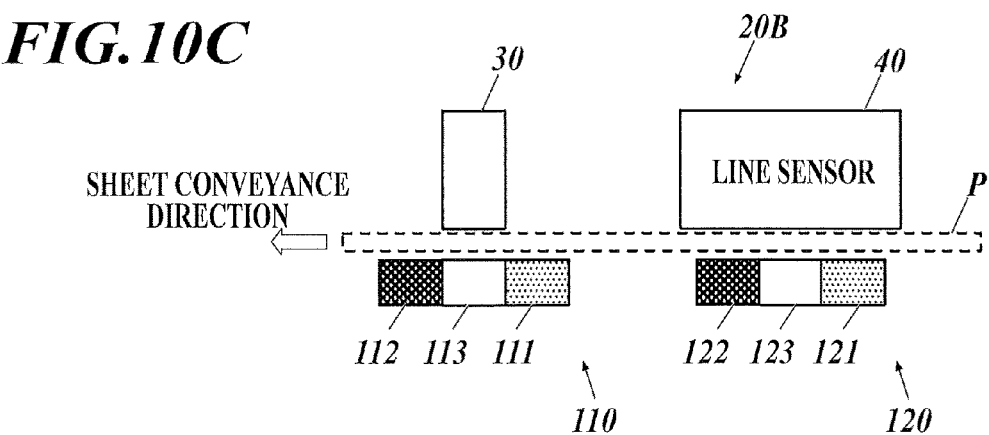
FIG. 10C is an example of calibration in the modification example of the second embodiment.

FIGS. 10A, 10B and 10C are schematic views of the image reading section 20B.

The image reading section 20B includes a colorimeter 30, a line sensor 40, an opposing member 110, an opposing member 120, a first driving section (not shown in the drawings), a second driving section (not shown in the drawings) and such like.

The opposing member 110 can move in parallel to the sheet conveyance direction. The opposing member 110 has respective regions of a white backing member 111, a black backing member 112 and a calibration plate 113. By the opposing member 110 moving in parallel to the sheet conveyance direction, any one region of the white backing member 111, the black backing member 112 and the calibration plate 113 is located at a position facing the colorimeter 30.

The opposing member 120 can move in parallel to the sheet conveyance direction. The opposing member 120 has respective regions of the white backing member 121, a black backing member 122 and a shading plate 123. By the opposing member 120 moving in parallel to the sheet conveyance direction, any one region of the white backing member 121, the black backing member 122 and the shading plate 123 is located at a position facing the line sensor 40.

In FIG. 10A, the white backing member 111 of the opposing member 110 is located at a position facing the colorimeter 30, and the white backing member 121 of the opposing member 120 is located at a position facing the line sensor 40. In FIG. 10B, the black backing member 112 of the opposing member 110 is located at a position facing the colorimeter 30, the black backing member 122 of the opposing member 120 is located at a position facing the line sensor 40. In FIG. 10C, the calibration plate 113 of the opposing member 110 is located at a position facing the colorimeter 30, and the shading plate 123 of the opposing member 120 is located at a position facing the line sensor 40.

The white backing member 111 of the opposing member 110 and the white backing member 121 of the opposing member 120 are formed of members having a same physical property.

The black backing member 112 of the opposing member 110 and the black backing member 122 of the opposing member 120 are formed of members having a same physical property.

For the calibration plate 113 of the opposing member 110 and the shading plate 123 of the opposing member 120, reference white optimized for respective devices (colorimeter 30 and line sensor 40) may be used.

The first driving section moves the opposing member 110 in parallel to the sheet conveyance direction and switches the region facing the colorimeter 30 to any one of the white backing member 111, the black backing member 112 and the calibration plate 113.

The second driving section moves the opposing member 120 in parallel to the sheet conveyance direction and switches the region facing the line sensor 40 to any one of the white backing member 121, black backing member 122 and the shading plate 123.

The first and second driving sections are formed of solenoid, for example.

The CPU 11 controls the first and second driving sections so that the backing member used for reading by the colorimeter 30 is the white backing member 111 when the backing member used for reading by the line sensor 40 is the white backing member 121, and the backing member used for reading by the colorimeter 30 is the black backing member 112 when the backing member used for reading by the line sensor 40 is the black backing member 122.

The first image adjustment processing is similar to the processing shown in FIG. 5.

The facing surface determination processing is similar to the processing shown in FIG. 9.

As described above, according to the modification example of the second embodiment, it is possible to improve estimation calculation accuracy when estimating reading information (color values) of the colorimeter 30 from the reading information (RGB values) of the line sensor 40 by setting the backing members (white backing members 111 and 121, black backing members 112 and 122) used for reading by the colorimeter 30 and the line sensor 40 to have the same physical property.

It is possible to easily switch the region of the opposing member 110 facing the colorimeter 30 by controlling the first driving section to move the opposing member 110 in parallel.

It is possible to easily switch the region of the opposing member 120 facing the line sensor 40 by controlling the second driving section to move the opposing member 120 in parallel.

Third Embodiment

Next, a third embodiment to which the present invention is applied will be described.

Since the image forming apparatus 300 in the third embodiment has the same configuration as the image forming apparatus 100 shown in the first embodiment, FIG. 1 is used, and the explanation of the common configurations will be omitted. The test chart 70 is similar to that shown in FIG. 3. Hereinafter, configurations and processing characteristics of the third embodiment will be described.

After the sheet P on which image was formed is conveyed through the conveyance paths R2 and R4 shown in FIG. 1, the sheet P can also be directly transmitted to the conveyance path R6, conveyed through the conveyance path R8 and returned to the conveyance path R2 again without being inverted through the conveyance path R5.

Figure 11:
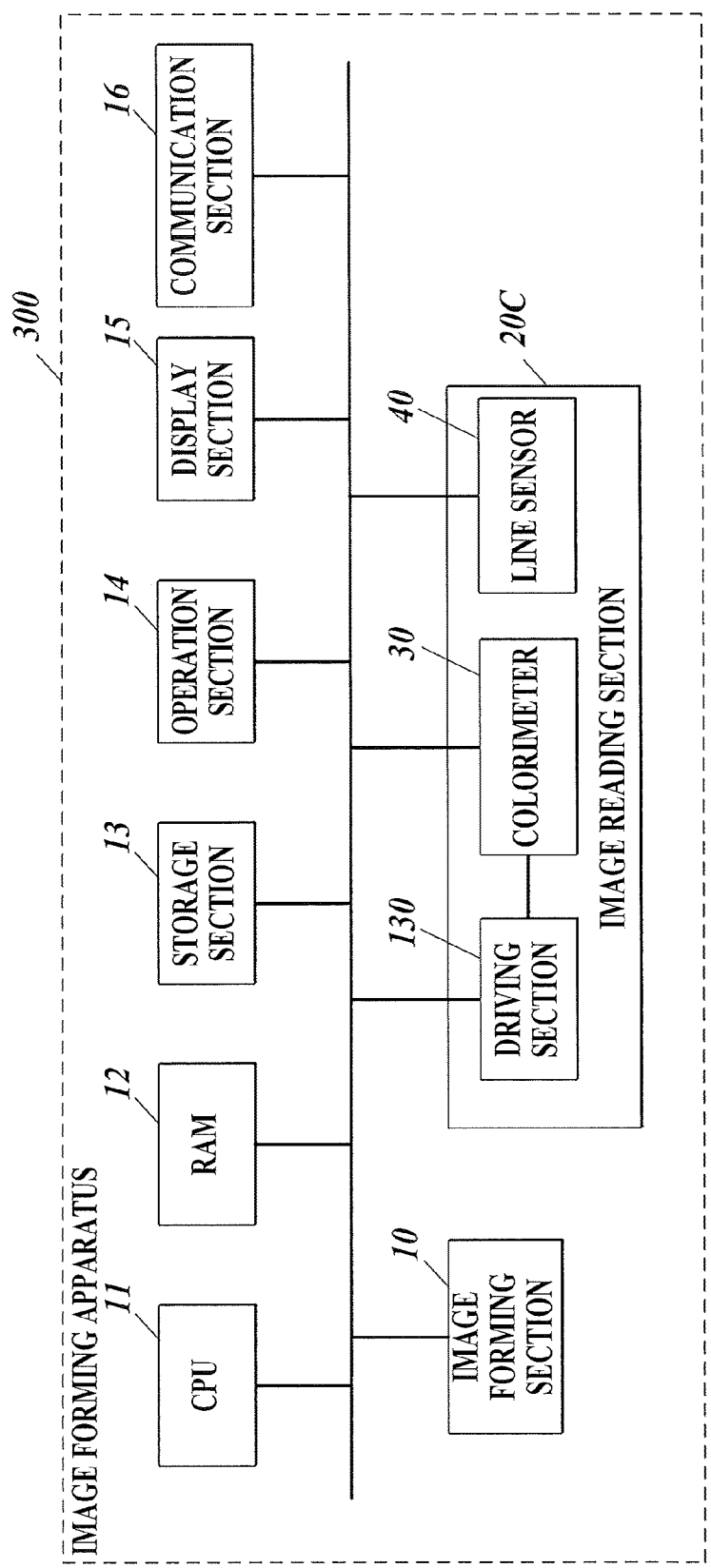
FIG. 11 is a block diagram showing a functional configuration of an image forming apparatus in a third embodiment.

FIG. 11 is a block diagram showing a functional configuration of the image forming apparatus 300.

As shown in FIG. 11, the image forming apparatus 300 includes the CPU 11, the RAM 12, the storage section 13, the operation section 14, the display section 15, the communication section 16, the image forming section 10, the image reading section 20C and such like. Explanation of the configuration same as the image forming apparatus 100 is omitted.

The image reading section 20C includes the colorimeter 30, the line sensor 40, the driving section 130 and such like.

Figure 12:
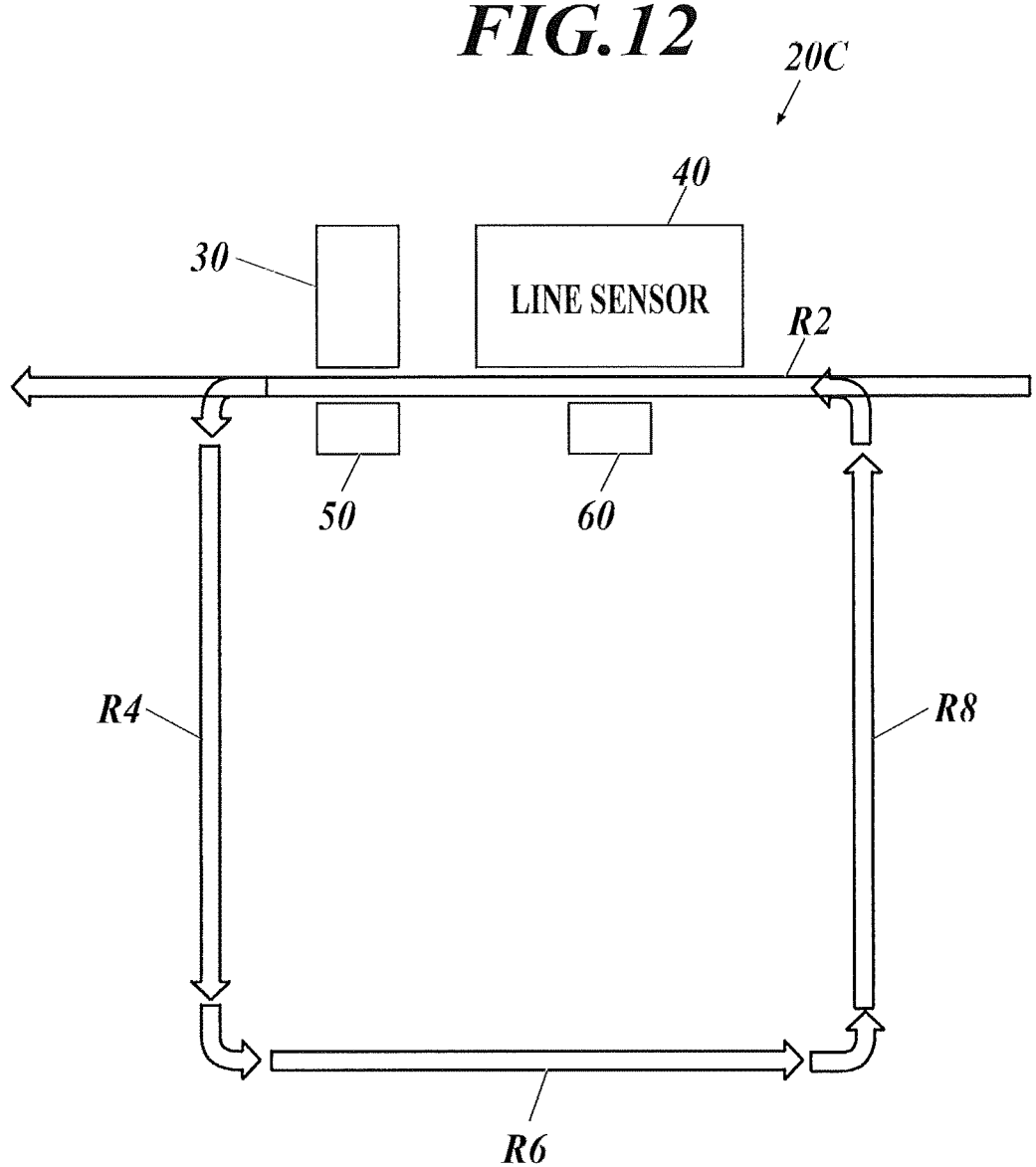
FIG. 12 is a configuration view of an image reading section in the third embodiment.

FIG. 12 shows the configuration of the image reading section 20C. By circulating the sheet P through the conveyance paths R2, R4, R6 and R8 in the image reading section 20C, it is possible to read out the same surface of the same sheet a plurality of times with the colorimeter 30. In FIG. 12, the conveyance paths R5 and R7 shown in FIG. 1 are omitted; however, the inversion of sheet P and image formation on both surfaces of sheet P are also possible in the third embodiment.

The driving section 130 moves the colorimeter 30 along the main scanning direction orthogonal to the conveyance direction of sheet P. That is, the driving section 130 functions as a movement section. The driving section 130 is formed of a rack-and-pinion or a belt-like movement means, for example.

Figure 13:
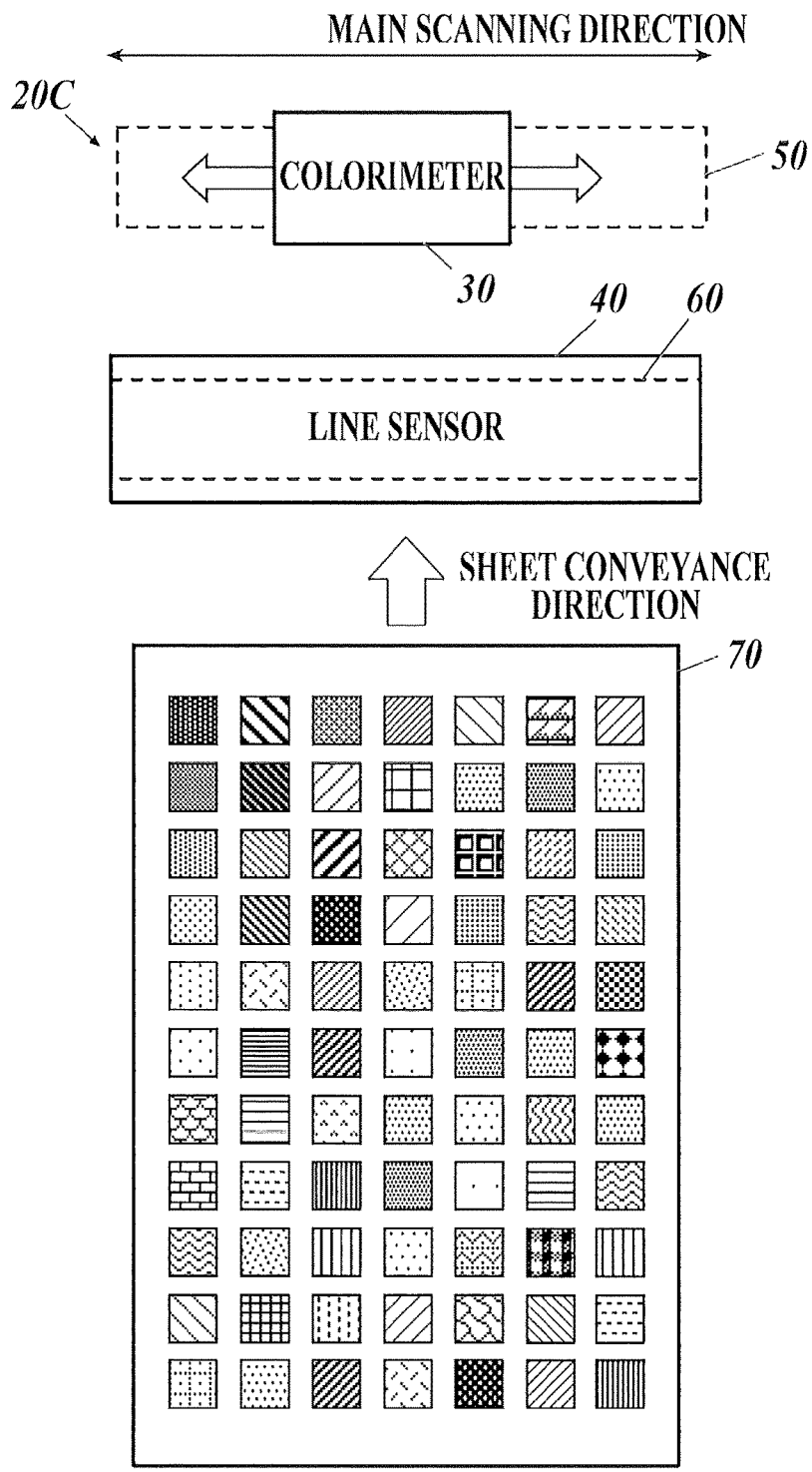
FIG. 13 is a view showing a relationship between an image reading section and a test chart.

FIG. 13 schematically shows a relationship between the image reading section 20C and the test chart 70.

The colorimeter 30 can move along the main scanning direction. The colorimeter 30 reads out color patches included in the region corresponding to the position in the main scanning direction of the colorimeter 30 among the color patches included in the test chart 70.

The line sensor 40 reads out all the color patches included in the test chart 70 similarly to the first embodiment.

Each of the backing members 50 and 60 is formed of a member having the same physical property similarly to the first embodiment. The backing member 50 has the length over the entire image formation width in the main scanning direction.

The CPU 11 circulates the sheet P (test chart 70) on which an adjustment pattern is formed through the conveyance paths R2, R4, R6 and R8. The CPU 11 controls the driving section 130 so that the colorimeter 30 reads out a different region in the main scanning direction every time the same sheet (test chart 70) passes the reading position of the colorimeter 30. That is, the CPU 11 functions as a movement control section.

FIGS. 14A to 14C show relationships between the positions in main scanning direction of the colorimeter 30 and the test chart 70.

When the colorimeter 30 is located at the position shown in FIG. 14A, the color patch group 71a included in the test chart 70 is read out by both the colorimeter 30 and the line sensor 40, and the color patch group 72a included in the test chart 70 is read out only by the line sensor 40.

When the colorimeter 30 is located at the position shown in FIG. 14B, the color patch group 71b included in the test chart 70 is read out by both the colorimeter 30 and the line sensor 40, and the color patch groups 72b included in the test chart 70 are read out only by the line sensor 40.

When the colorimeter 30 is located at the position shown in FIG. 14C, the color patch group 71c included in the test chart 70 is read out by both the colorimeter 30 and the line sensor 40, and the color patch group 72c included in the test chart 70 is read out only by the line sensor 40.

Next, operation of the image forming apparatus 300 in the third embodiment will be described.

Figure 15:
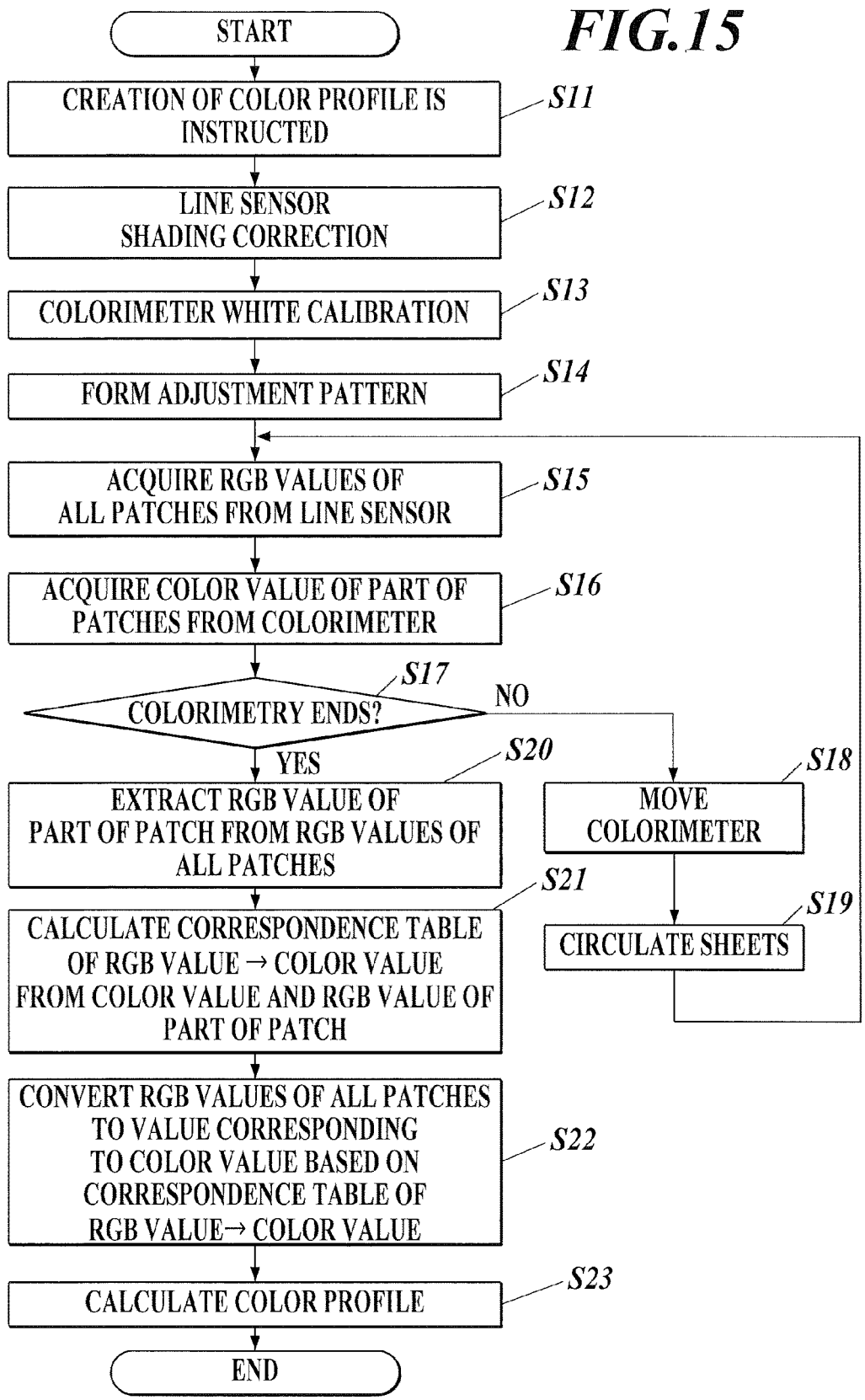
FIG. 15 is a flow chart showing second image adjustment processing.

FIG. 15 is a flow chart showing second image adjustment processing. The processing is achieved by software processing in cooperation between the CPU 11 and a program stored in the storage section 13.

Since the processing in steps S11 to S15 is similar to that of steps S1 to S5 in FIG. 5, the explanation thereof is omitted. In step S15, the backing member 60 is used.

The CPU 11 obtains color values (XYZ values, L*a*b* values) obtained by reading out a part of color patches included in the region corresponding to the position of colorimeter 30 in the main scanning direction among the color patches included in the test chart 70 from the colorimeter 30 (step S16). At this time, the backing member 50 is used.

The CPU 11 determines whether colorimetry of predetermined color patches by the colorimeter 30 is finished (step S17). If the colorimetry of the predetermined color patches is not finished (step S17; NO), the CPU 11 controls the driving section 130 to move the position of colorimeter 30 in the main scanning direction (step S18), and circulates the sheet P (test chart 70) on which an adjustment pattern is formed through the conveyance paths R2, R4, R6 and R8 (step S19).

The processing returns to step S15 and repeated until colorimetry of color patches by the colorimeter 30 at the predetermined plurality of positions are finished. Specifically, the colorimeter 30 is moved to respective positions shown in FIGS. 14A to 14C, and color patches of regions corresponding to the respective positions of colorimeter 30 are read out.

In step S17, if the colorimetry of predetermined color patches is finished (step S17; YES), the processing shifts to step S20. Since the processing of steps S20 to S23 is similar to that of steps S7 to S10 in FIG. 5, the explanation thereof is omitted.

In the processing, the line sensor 40 reads out all the color patches a plurality of times in step S15 every time the test chart 70 is circulated through the conveyance paths R2, R4, R6 and R8. Thus, as the RGB values corresponding to each of the color patches, an average value of the values obtained by measuring the color patch a plurality of times.

In the processing, the part of the color patches which were read out by the colorimeter 30 include the color patches which were read out at the changed positions by changing the position of colorimeter 30 (for example, color patch group 71a shown in FIG. 14A, color patch group 71b shown in FIG. 14B and color patch group 71c shown in FIG. 14C).

As described above, according to the third embodiment, it is possible to improve estimation calculation accuracy when estimating reading information (color values) of colorimeter 30 from the reading information (RGB values) of the line sensor 40 by setting the backing members 50 and 60 used for reading by the colorimeter 30 and the line sensor 40 to have the same physical property.

Furthermore, by circulating the sheet P (test chart 70) on which an adjustment pattern is formed through the conveyance paths R2, R4, R6 and R8, it is possible to increase the number of color patches read out by the colorimeter 30 among the color patches included in the same sheet and improve calibration accuracy of line sensor 40 using the colorimeter 30.

The third embodiment has been described by illustrating a case where the backing member 50 has the length over the entire image formation width in the main scanning direction; however, the backing member 50 may have a length corresponding to the moving range of colorimeter 30 in the main scanning direction. In a case where the length in main scanning direction of the backing member 50 is limited, the position of backing member 50 may be moved according to the movement of the colorimeter 30.

In the second image adjustment processing, the processing may return to step S16 after step S19 without reading out color patches with line sensor 40 a plurality of times.

The above description of the embodiments shows examples of an image forming apparatus according to the present invention, and the present invention is not limited to this. The detailed configurations and detailed operations of the sections forming the apparatus can be appropriately changed within the scope of the present invention.

A plurality of characteristic parts of the embodiments may be combined with each other.

For example, the configuration may be such that backing members having the same physical property are selected among a plurality of backing members as the backing members of the colorimeter 30 and the line sensor 40 as in the second embodiment, and the position in the main scanning direction of colorimeter 30 is shifted to read out different regions every time the test chart 70 passes as in the third embodiment.

The backing member of colorimeter 30 and the backing member of line sensor 40 may not be separate members but a single connected member.

A reading device of close contact optical system such as a CIS (Contact Image Sensor) may be applied as the line sensor 40.

The first image adjustment processing (FIG. 5) and the second image adjustment processing (FIG. 15) may be performed not only when the user instructs to execute the processing, but also at power activation, every predetermined period, at maintenance by a serviceman and such like.

The above embodiments have been described by illustrating an example of electrophotographic image forming apparatus; however, the present invention may be applied to image forming apparatuses of ink jet type, print type and other types.

The above description shows an example in which a hard disk, a flash memory and such like are used as computer readable medium storing programs for executing the processing; however, the present invention is not limited to the example. As other computer readable medium, a portable recording medium such as a CD-ROM can also be applied. A carrier wave may also be applied as medium providing program data via a communication line.

The entire disclosure of Japanese Patent. Application No. 2014-108791 filed on May 27, 2014 including description, claims, drawings, and abstract are incorporated herein by reference in its entirety.

What is claimed is:

1. An image reading apparatus comprising:
    two image reading devices which are different from each other, read out a same surface of a same sheet after image formation on a sheet conveyance path and read out a plurality of common color patches formed in the same surface of the same sheet,
        wherein (i) one of the image reading devices is a first image reading device which reads out only a partial region in a main scanning direction, and (ii) the other of the image reading devices is a second image reading device which reads out over a full image formation width in the main scanning direction, said full image formation width read out by said second image reading device being larger than the partial region read out by said first image reading device;
    a calculation section which estimates a value equivalent to reading information of the first image reading device from reading information of the second image reading device on the basis of reading information obtained by reading out the common color patches;
    a first backing member used for reading by the first image reading device; and
    a second backing member used for reading by the second image reading device, wherein the first backing member and the second backing member are separate members and are each formed of a member having a same physical property.

2. The image reading apparatus according to claim 1, wherein the physical property includes opaqueness, surface condition, whether a fluorescent material is included, saturation and luminosity.

3. The image reading apparatus according to claim 1, further comprising:
    a sheet conveyance path for the first image reading device to read the same surface of the same sheet a plurality of times;
    a movement section which moves the first image reading device along the main scanning direction; and
    a movement control section which controls the movement section so that the first image reading device reads out a different region in the main scanning direction each time the same sheet passes.

4. The image reading apparatus according to claim 1, wherein
    the first image reading device is a colorimeter, and
    the second image reading device is a line sensor.

5. An image forming apparatus comprising the image reading apparatus according to claim 1.

6. An image reading apparatus comprising:
two image reading devices which are different from each other, read out a same surface of a same sheet after image formation on a sheet conveyance path and read out a plurality of common color patches formed in the same surface of the same sheet, one of the image reading devices being a first image reading device which reads out only a partial region in a main scanning direction and the other of the image reading devices being a second image reading device which reads out over an image formation width in the main scanning direction;
a calculation section which estimates a value equivalent to reading information of the first image reading device from reading information of the second image reading device on the basis of reading information obtained by reading out the common color patches;
white backing members which are respectively provided to the first image reading device and the second image reading device and each of which is formed of a member having a same physical property;
black backing members which are respectively provided to the first image reading device and the second image reading device and each of which is formed of a member having a same physical property;
switching sections which are respectively provided to the first image reading device and the second image reading device and each of which switches between a white backing member and a black backing member; and
a switching control section which controls the switching sections to set a white backing member as a backing member used for reading by the first image reading device when a white backing member is used for reading by the second image reading device, and set a black backing member as a backing member used for reading by the first image reading device when a black backing member is used for reading by the second image reading device.

7. The image reading apparatus according to claim 6, wherein the physical property includes opaqueness, surface condition, whether a fluorescent material is included, saturation and luminosity.

8. The image reading apparatus according to claim 6, further comprising:
a sheet conveyance path for the first image reading device to read the same surface of the same sheet a plurality of times;
a movement section which moves the first image reading device along the main scanning direction; and
a movement control section which controls the movement section so that the first image reading device reads out a different region in the main scanning direction each time the same sheet passes.

9. The image reading apparatus according to claim 6, wherein
the first image reading device is a colorimeter, and
the second image reading device is a line sensor.

10. An image forming apparatus comprising the image reading apparatus according to claim 6.

* * * * *